United States Patent [19]

Bielskis et al.

[11] Patent Number: 4,859,484
[45] Date of Patent: Aug. 22, 1989

[54] PROCESSED STARCH-GUM BLENDS

[75] Inventors: Edward Bielskis, Wheaton, Ill.; Albert J. Leo, Ontario, Calif.; Jane K. Zeien, Geneva, Ill.

[73] Assignee: Continental Colloids, Inc., West Chicago, Ill.

[21] Appl. No.: 181,383

[22] Filed: Apr. 14, 1988

[51] Int. Cl.$^4$ .............................................. A23L 1/195
[52] U.S. Cl. ..................... 426/573; 426/658; 426/578; 426/565; 426/589; 127/33; 127/71; 252/315.01
[58] Field of Search ............... 426/573, 578, 579, 565, 426/589, 656; 252/315 M; 127/32, 33, 69–71

[56] References Cited

U.S. PATENT DOCUMENTS

| | | | |
|---|---|---|---|
| 3,042,668 | 7/1962 | Monti et al. | 426/565 |
| 3,332,785 | 7/1967 | Kuchinke | 426/578 |
| 3,471,301 | 10/1969 | Mitchell et al. | 426/565 |
| 3,515,591 | 6/1970 | Feldman et al. | 426/578 |
| 3,955,009 | 5/1976 | Eskritt et al. | 426/578 |
| 4,064,282 | 12/1977 | Hallstrom et al. | 426/559 |
| 4,192,900 | 3/1980 | Cheng | 426/578 |
| 4,269,863 | 5/1981 | Inagami et al. | 426/578 |
| 4,415,599 | 11/1983 | Bos | 426/578 |
| 4,440,794 | 4/1984 | Davies | 426/578 |
| 4,491,483 | 1/1985 | Dudacek et al. | 127/33 |
| 4,585,657 | 4/1986 | Karwowski et al. | 426/285 |
| 4,597,974 | 7/1986 | Fonteneau et al. | 426/578 |

*Primary Examiner*—Jeanette Hunter
*Attorney, Agent, or Firm*—Wood, Dalton, Phillips Mason & Rowe

[57] ABSTRACT

A starch, hydrated with between 0.7 and 2.0 parts of water and which has been brought to the verge of gelatinization, is combined with a hydrocolloid gum, which also may have been pre-hydrated, to form a mixture. The mixing process is designed to achieve the following objectives: intimately mixing the hydrocolloid gum with the starch as the latter is gelatinizing; heating the uniform blend under pressure but under low enough shear to preclude starch degradation; and extruding it through a die so that it expands and creates a product with a large surface area to facilitate drying. As an objective measure of processing effectiveness, the product should yield water viscosities which are equal to those obtained from the raw materials when present in 10–20% excess. In subjective tests the processed mixture should perform better at 10–20% less usage level than the unprocessed mixtures when used in stabilizing frozen desserts, sour cream and dressings. In particular, a starch guar mixture processed in this manner can replace the more expensive gums, such as locust, in frozen desserts.

16 Claims, No Drawings

PROCESSED STARCH-GUM BLENDS

FIELD OF THE INVENTION

The present invention generally relates to a blend of starch and gums and, more particularly, to a method of processing such a blend to obtain desirable properties not exhibited by simple mechanical mixtures of the two components.

BACKGROUND OF THE INVENTION

Hydrocolloid gums of the type contemplated by this invention have traditionally been recognized for their ability to bind water, provide increased viscosity, suspend solids, protect emulsions, and retard crystalization, including ice crystal growth in frozen foods. As used herein, the term "hydrocolloid gum" is meant to include such colloids as pectin, algin, carrageenin, xanthan, cellulose ether, microcrystalline cellulose, karaya and agar. Some of the starch/hydrocolloid blends envisioned in this invention as simple mixtures of dry powders have been used in the past to modify the properties obtainable with any of the components used alone. For example, U.S. Pat. No. 4,064,282 describes a starch sponge which is given added stability by the addition of hydrocolloid gums, U.S. Pat. No. 4,415,599 describes a starch/guar gum blend useful as a gravy or sauce mix, and U.S. Pat. No. 3,955,009 proposes a pre-gelatinized starch, acid and hydrocolloid gum blend as a dry dessert mix composition.

It can readily be demonstrated that such mechanical (i.e. un-processed) starch/gum blends exhibit properties that are certainly not synergistic but, rather, additive at best. The present invention discloses a process whereby the desirable properties of a blend of starch and guar, for instance, can be greatly enhanced over those shown by mere mechanical mixtures.

Whereas unprocessed starch will lose a great deal of its water of hydration upon freezing, the blends processed as described in this invention are well-suited for stabilizing frozen desserts, such as ice cream, ice milk and sherbet. Furthermore when guar gum is used, either alone or together with unprocessed starch, its stabilizing properties are not as long-lasting as that produced by the more expensive hydrocolloid gums, such as locust or cellulose gum and, at high levels, guar imparts a "stickiness" which is undesirable. As this invention demonstrates, a processed blend of starch and guar gum overcomes both of these shortcomings, i.e., it gives longer-lasting heat-shock protection together with a "shorter" body.

Among the many patented processes for chemically modifying hydrocolloids such as starch, guar and locust gum to alter their physical properties, are the following: to cross-link starch, U.S. Pat. No. 3,878,196 uses $POCl_3$ while U.S. Pat. No. 3,705,046 uses formaldehyde; starch ethers or esters have been prepared according to U.S. Pat. No. 3,728,332 using N-stearylguanidine, and according to U.S. Pat. No. 3,706,730 using benzyl chloride; carboxyalkyl ethers of galactomannan gums have been prepared using sodium chloroacetate according to U.S. Pat. Nos. 3,712,883, and 3,740,388.

Chemical modification may involve cross-linking of the hexose chains, esterification or etherification of some hydroxyl groups, or oxidation of some of the primary hydroxyls to carboxyls but in every case covalent bonds are added or altered to accomplish the desired result. For this reason, in the preliminary investigations which led to the present invention, it was assumed that covalent linkages would be required between the two types of hydrocolloids, such as the starch and gum, if a significant degree of synergism was to be achieved. Therefore, it came as a complete surprise to discover processing conditions under which a negligible amount of new covalent links are formed and yet the starch and gum are bonded together in such a way as to yield new and valuable properties.

Taking a 50/50 mechanical blend of fine-mesh guar and starch as an example, it is believed that upon hydration with an excess of water up to the boiling point and up to the maximum practical usage level (about 3% in foods), each particle swells independently. None of the end-product processing conditions are believed to favor the formation of colloid-to-colloid bonds over colloid-to-water hydrogen bonds. This is believed true for food products processed at ambient pressure or retorted, just as it is believed true for industrial products, such as textile dyes, paper sizes, and oil drilling muds. Even the high shear homogenization used in ice cream mixes does not serve to combine the components of this mixture, but is believed to merely degrade the starch viscosity with the latter being especially true in low fat formulations.

SUMMARY OF THE INVENTION

According to the present invention, the same 50/50 mechanical blend of fine-mesh guar and starch can be separately "force-hydrated" at a relatively high concentration (e.g., 40–50% solids), then combined and subjected to intense agitation and pressure to achieve intimate comingling, after which the resultant product can be dried in a way to encourage a considerable degree of inter-colloid hydrogen bonding that is non-covalent. It is believed that the processing described in this invention encourages the exchange of the hydrogen bonds, which initially form between colloid and water, with those bonding colloid-to-colloid and, even though each hydrogen bond is relatively weak, the large number of inter-molecular hydrogen bonds which are formed insures that the separate components of the processed blend of starch and guar will not act independently when subsequently dissolved in water. In this form, the starch will act much like a pre-gelatinized starch in that it dissolves in cold water and is not dehydrated by freezing, and the starch effectively adds to the molecular weight of the guar, imparting higher viscosity, and yet reducing the "stringy" character of sols of unmodified guar which is especially noticeable in sugar solutions.

Accordingly, it is a principal object of this invention to intimately combine a hydrated starch with a hydrated colloid gum such as guar, and to dry the mixture in such a way as to encourage as much inter-colloid hydrogen bonding as possible. A further object of this invention is to accomplish a sufficient degree of hydration at the lowest possible level of added water so that the energy needed to dry the mixture is minimized. Another object of this invention is to accomplish the hydration, comingling, and drying of the colloid-starch mixture without undue shearing or high temperatures which can degrade the finished product. A further object of this invention is to prepare a bonded starch-gum mixture such that, in a 50/50 blend, the processed material is from 10% to 20% more effective than the unprocessed as measured by water viscosity, i.e., 1.0 g. of the processed mixture should give a water viscosity equal to between 1.1 and 1.2 g. of the simple dry blend under the same solution conditions. It is a still further object of this invention to combine starch with guar in such a way as to improve the performance of guar as a frozen dessert stabilizer and, in particular, to enable it to function as a replacement for the more expensive locust or cellulose gums or reduce the quantity of the expensive gum that is required.

Still additional advantages and features of the present invention will become apparent from a consideration of the following detailed description.

DETAILED DESCRIPTION

Depending upon the source, starch granules contain amylose and amylopectin in varying proportions. All types of starch seem to be candidates for this invention, and the choice of starch with either high or low amylose level should be dictated by the type of gum or gums to be used in the mixture and the end use for which it is intended. To make the amylose and amylopectin molecules available for intimate comingling with the galactomanan of either guar or locust, for example, it is first necessary to disrupt the starch granules.

Basically, the variables which most directly affect the disruption of the starch granules, (i.e. influence granule rupture) are three: moisture level, temperature, and shear. When processing starch with guar, it is important to consider the timing of water addition, for guar has a higher water affinity and will actually dehydrate pre-soaked starch.

According to the invention, a composition of matter is provided having at least two components which includes a starch and a hydrocolloid gum. Each of the components has been hydrated separately with between 0.7 and 2.0 parts of water for the starch and between 0.2 and 2.0 parts of water for the hydrocolloid gum. After hydration, the components are intimately comingled, heated, cooled, dried, and pulverized to produce a finished product.

Preferably, the initial starch component is selected from the group consisting of corn, waxy-maize, potato, wheat, tapioca, rice, or commercially available modifications of these starches. Also, the hydrocolloid is preferably selected from the group consisting of guar gum, locust gum, karaya, cellulose gum, cellulose ether, microcrystaline cellulose, xanthan, pectin, algin, carrageenin, or agar.

In one formulation, up to 2% of a salt based on finished dry weight of starch is added during its hydration. The salt is added to raise the pH of a 2% solution of the finished product to not more than 8.0. Preferably, the salt is selected from the group consisting of tetrasodium pyrophosphate, hexametaphosphate, disodiumphosphate and sodium citrate.

One preferred procedure for a simple starch-guar blend is to prepare the starch as a 50% slurry at a temperature just below its thickening point (120° F. in the case of corn starch). Then guar in the form of "splits" can be separately hydrated with a moisture content of 30-55% for not less than 15 minutes in warm or cool water to which may be added a gas-releasing agent selected to release gas only at a predetermined temperature level. Still in the form of a "dry" kernels, the guar splits can be fed to a roller mill to be pressed into thin flakes of approximately 1 mm thickness. These guar flakes can then be fed by means of a metering screw to the inlet of a twin-screw extruder-cooker such as one of those supplied by Baker-Perkins, Werner-Pfleiderer, Wenger or Clextral. At this point or very shortly downstream, the starch slurry can be metered in by a positive pump.

Alternatively, the hydrated guar splits can be fed to a first section of an extruder having a die creating a back pressure sufficient to expand the splits. The hydrated and expanded splits then can be passed through a knife mill before passing to a second section of the extruder where the hydrated starch is added.

After the section in which the separate feeds are mixed and conveyed by screw action, the mixture is kneaded. The kneading of the mixture is, depending upon the conditions, accompanied by an increase in temperature in the range of approximately 190-390° F. The intimately blended and comingled starch-guar which becomes a semi-solid mass is then extruded at a temperature at which it expands and hardens much like a snack food, i.e., a temperature of approximately 190-390° F. Thereafter, the expanded and hardened starch-guar is immediately cut into small sections, fed to a cooling belt and then to a band dryer where the moisture level is reduced to less than 10% for efficient pulverizing of the small cut sections by means of a hammer mill.

Preferably, the cooker-extruder is of the twin-screw configuration formed with two substantially identical intermeshing screws. The screws rotate in the same direction in a bore of a fixed barrel. In this connection, the screws rotate on shafts supporting individual kneading elements of different pitches and lengths.

Many variations in the above procedure will be evident to those versed in extrusion technology. Several specific examples utilizing a Werner-Pfleiderer ZSK-30 Twin-screw Extruder are furnished below:

| EXAMPLE IA | |
|---|---|
| Guar-starch | % On Dry Basis |
| flaked guar splits (50% M.) | = 50.0 |
| corn starch slurry (50% M.) | = 50.0 |
| Extrusion parameters: See Table I. | |

| EXAMPLE IB | |
|---|---|
| Guar-starch | % On Dry Basis |
| guar powder | = 50.0 |
| starch slurry (50% M.) | = 50.0 |
| Extrusion parameters: See Table I. | |

| EXAMPLE II | |
|---|---|
| Guar-starch + phosphate | % On Dry Basis |
| guar powder | = 50.0 |
| starch slurry (50% solids) | = 48.0 |
| tetrasodium pyrophosphate | = 2.0 |
| Extrusion parameters: See Table I. | |

| EXAMPLE III | |
|---|---|
| Guar/Locust-starch | % On Dry Basis |
| guar powder | = 30.0 |
| locust powder | = 20.0 |
| potato starch slurry (50% M.) | = 50.0 |
| Extrusion parameters: See Table I. | |

| EXAMPLE IV | |
|---|---|
| Guar/Xanthan-starch | % On Dry Basis |
| flaked guar splits | = 45.0 |
| xanthan gum | = 5.0 |
| wheat starch slurry (50% M.) | = 50.0 |
| Extrusion parameters: See Table I. | |

| EXAMPLE V | |
|---|---|
| Guar/Microcrystaline cellulose-starch | % On Dry Basis |
| guar powder | = 30.0 |
| microcrystaline cellulose | = 20.0 |
| tapioca starch slurry (50% M.) | = 48.0 |
| sodium hexametaphosphate | = 2.0 |
| Extrusion parameters: See Table I. | |

For a variation of Example IA, the hydrated guar splits can be fed directly to the first stage of a twin-screw extruder. The expanded, wet extrudate is chopped with a Fitzmill (knives forward) and fed to the second stage where the corn starch slurry is metered in. The extrusion parameters in the second stage can be set very nearly the same as in Example IA (see Table I).

TABLE I
AVERAGE EXTRUSION PARAMETERS FROM ACTUAL TEST CONDITIONS

| Ex. # | Screw Speed (RPM) | Dry Feed Rate (gram/min) | Zone #1 Water (g/min) | Zone #1 Temp. °F. (set/actual) | Zone #2 Slurry (g/min) | Zone #2 Temp. °F. (set/actual) | Zone #3 Temp. °F. (set/actual) | Zone #4 Temp °F. (set/actual) | Zone #5 Temp. °F. (set/actual) | Discharge Temp °F. psi |
|---|---|---|---|---|---|---|---|---|---|---|
| IA. | 250 | 235 | 0 | 130/120 | 235 | 150/156 | 260/260 | 341/341 | 374/374 | 345/460 |
| IB. | 350 | 340 | 34 | 130/120 | 680 | 170/192 | 226/226 | 341/341 | 311/311 | 356/580 |
| II. | 350 | 340 | 34 | 138/142 | 680 | 153/153 | 198/198 | 237/237 | 259/259 | 275/400 |
| III. | 350 | 317 | 34 | 136/136 | 634 | 154/154 | 199/199 | 234/234 | 253/253 | 266/430 |
| IV. | 350 | 317 | 34 | 136/136 | 634 | 154/154 | 199/199 | 234/234 | 253/253 | 266/430 |
| V. | 350 | 317 | 34 | 138/142 | 680 | 153/153 | 198/198 | 237/237 | 259/252 | 275/400 |

For evaluation purposes, water viscosity data in centipoises, measured on a Brookfield LVT, were collected for each of the following:
A. Cold after 10 minutes, 30 minutes, and overnight.
B. Heated to 180° F. and cooled to 80° F.; also after freeze/ thaw.
C. Repeat cold after 10 minutes, 30 minutes, and overnight at pH=3.0 (citric acid).
D. Repeat heated to 180° F. and cooled to 80° F.; also after freeze/thaw at pH=3.0 (citric acid).
E. For sugar viscosities, mix 100 ml. of Example II (not frozen) with 100 ml. 60% sucrose solution.

For each processed run, a control was made up by mechanically mixing the dry ingredients based on the dry weights present in that run. Viscosity data for selected examples are presented in Table II.

TABLE II
Viscosity Data

A. Cold Viscosity (1.5% solution)

| Example # | 10 min (cps) | 30 min (cps) | Overnight (cps) |
|---|---|---|---|
| IA. | 464 | 515 | 535 |
| Control | 10 | 10 | 15 |
| IB. | 1737 | 2872 | 3093 |
| Control | 647 | 870 | 1299 |
| II. | 1357 | 1455 | 1593 |
| Control | 388 | 709 | 1155 |
| III. | 884 | 1820 | 5460 |
| Control | 338 | 584 | 750 |
| IV. | 1786 | 3200 | 4250 |
| Control | 1786 | 2650 | 3010 |
| V. | 340 | 428 | 1430 |
| Control | 164 | 270 | 380 |

B. Heated and Cooled Viscosity and Freeze/Thaw Viscosity (1.5% solution)

| Example # | Heated and Cooled (cps) | Freeze/Thaw (cps) |
|---|---|---|
| IA. | 1258 | 2350 |
| Control | 15 | — |
| IB. | 2279 | 3373 |
| Control | 1534 | — |
| II. | 1310 | 2185 |
| Control | 1631 | — |
| III. | 2108 | 2250 |
| Control | 1634 | — |
| IV. | 3040 | 3040 |
| Control | 3010 | — |
| V. | 630 | 610 |
| Control | 502 | — |

C. Acid Solution Viscosity (1.5% solution)

| Example # | Cold 10 min (cps) | Cold 30 min (cps) | Cold Overnight (cps) |
|---|---|---|---|
| IA. | 1050 | 1280 | 1580 |
| IB. | 1395 | 1751 | 2247 |
| II. | 1181 | 1355 | 1661 |
| III. | 1405 | 1620 | 1980 |
| IV. | 1500 | 1820 | 2260 |
| V. | 450 | 510 | 750 |

D. Acid Solution Viscosity (1.5% solution)

| Example # | Heated and Cooled (cps) | Freeze/Thaw (cps) |
|---|---|---|
| IA. | 785 | 950 |
| IB. | 1920 | 2010 |
| II. | 1440 | 1510 |
| III. | 1310 | 1250 |
| IV. | 1850 | 1510 |
| V. | 410 | 520 |

E. Sugar Solutions Hot Viscosities

| Example # | Hot (cps) |
|---|---|
| IA. | 227 |
| IB | 523 |
| II. | 561 |
| III. | 650 |
| IV. | 480 |
| V. | 157 |

SUBJECTIVE EVALUATION

The products from several of the examples above were used as the basic hydrocolloid portion of various food stabiliser formulations. After preparation into the final food, it was subjected to accelerated storage tests and evaluated by experienced taste panelists. Scores are based upon body and texture using a scale of one to five with five being the highest possible score. In each instance, the control is an unprocessed, dry blend of the ingredients, and the formulations and results are as follows:

| Ingredients | Sherbet | Ice Milk |
|---|---|---|
| Butterfat | 1.00% | 4.00% |
| Milk-Solids-Non-Fat | 1.00% | 12.00% |
| Whey Solids | 1.00% | 0.00% |
| Sucrose | 20.00% | 12.00% |
| Corn syrup solids | 9.00% | 8.00% |
| Stabilizer | 0.33% | 0.41% |
| Emulsifier | 0.11% | 0.20% |
| Total Solids | 32.44% | 36.61% |

| Results: Example # | Sherbet | Ice Milk |
|---|---|---|
| IB. | 4 | 4.5 |
| Control | 3 | 4 |
| II | 4 | 4.5 |
| Control | 3 | 4 |
| III | 4 | 5 |
| Control | 3 | 4 |

The above examples were also evaluated in sour cream, ice cream, an acidic sauce and salad dressing applications with favorable replacement of commonoly used gum systems and are thus believed suitable for frozen desserts, dressings and sauces, sour cream, cream cheese and cheese spreads and yogurt.

As an objective measure of processing effectiveness, the product should yield water viscosities which are equal to those obtained from the raw materials when present in 10–20% excess. In subjective tests the processed mixture should perform better at 10–20% less usage level than the unprocessed mixtures when used in stabilizing frozen desserts, sour cream and dressings.

What is claimed is:

1. A composition of matter comprising two components including a starch and a hydrocolloid gum, each of said components having been hydrated separately, said starch having been hydrated with greater than 0.7 parts of water, said hydrocolloid gum having been hydrated with greater than 0.2 parts of water, said components then having been intimately comingled, heated, cooled, dried, and pulverized to produce a finished product.

2. The composition of matter as defined in claim 1 wherein each of said components has been hydrated with no greater than 2.0 parts of water.

3. The composition of matter as defined in claim 1 wherein said starch is selected from the group consisting of corn, waxy-maize, potato, wheat, tapioca, rice, or modifications thereof, and said hydrocolloid gum is selected from the group consisting of guar, locust, karaya, cellulose, cellulose ether, microcrystaline cellulose, xanthan, pectin, algin, carrageenin, or agar.

4. The composition of matter as defined in claim 1 wherein up to 2% of a salt based on finished dry weight is added during hydration of said starch, said salt raising the pH of a 2% solution of said finished product to not more than 8.0, said salt being selected from the group consisting of tetrasodium pyrophosphate, hexametaphosphate, disodium-phosphate and sodium citrate.

5. A process for enhancing the properties of starch-hydrocolloid blends comprising the steps of first hydrating a starch and separately hydrating a hydrocolloid, and then thoroughly blending and comingling said hydrated starch and hydrated hydrocolloid as a semi-solid mass, and then heating said semi-solid mass to a temperature between 190° F. and 390° F., and then cooling, drying and pulverizing said semi-solid mass to a mesh size facilitating dissolution.

6. The process as defined in claim 5 wherein said hydrocolloid is guar gum in the form of splits, said splits being soaked for not less than 15 minutes in warm or cool water so as to be hydrated to a final moisture level of between 30 and 55%, said splits thereafter being passed through a roller mill to produce flakes of approximately 1 mm thickness, said flakes then being fed to a cooker-extruder to which said hydrated starch is being added either at the same or a later point in time.

7. The process as defined in claim 6 wherein a gas-releasing agent is added to said water in which said guar splits are hydrated, said gas-releasing agent being selected to release gas only at a predetermined temperature level.

8. The process as defined in claim 5 wherein said hydrocolloid is guar gum in the form of splits, said splits being soaked for not less than 15 minutes in warm or cool water so as to be hydrated to a final moisture level of between 30 and 55%, said hydrated splits thereafter being fed to an extruder having a first section with a die creating a back pressure sufficient to expand said splits, said hydrated and expanded splits then being passed through a knife mill before passing to a second section of said extruder, said hydrated starch being added in said second section of said extruder.

9. The process as defined in claim 6 wherein said cooker-extruder is of a twin-screw configuration formed with two substantially identical intermeshing screws, said screws rotating in the same direction in a bore of a fixed barrel, said screws rotating on shafts supporting individual kneading elements of different pitches and lengths.

10. An edible food composition comprising a major portion of a food product and a minor portion of two components including a starch and a hydrocolloid gum, each of said components having been hydrated separately, said starch having been hydrated with greater than 0.7 parts of water, said hydrocolloid gum having been hydrated with greater than 0.2 parts of water, said components then having been intimately comingled, heated, cooled, dried, and pulverized.

11. The edible food composition as defined by claim 10 wherein each of said components has been hydrated with no greater than 2.0 parts of water.

12. The edible food composition as defined by claim 10 wherein said starch is selected from the group consisting of corn, waxy-maize, potato, wheat, tapioca, rice, or modifications thereof, and said hydrocolloid gum is selected from the group consisting of guar, locust, karaya, cellulose, cellulose ether, microcrystaline cellulose, xanthan, pectin, algin, carrageenin, or agar.

13. The edible food composition as defined by claim 10 wherein up to 2% of a salt based on finished dry weight is added during hydration, said salt raising the pH of a 2% solution of said two components to not more than 8.0, said salt being selected from the group consisting of tetrasodium pyrophosphate, hexametaphosphate, disodiumphosphate and sodium citrate.

14. The edible food composition as defined by claim 10 wherein said food product is at least partially formed of solids selected from the group consisting of one or more of butterfat, milk-solids-non-fat, whey solids, sucrose, corn syrup solids, a stabilizer or an emulsifier.

15. The edible food composition as defined by claim 10 wherein said food product is selected from the group consisting of frozen desserts, dressings and sauces, sour cream, cream cheese and cheese spreads, or yogurt.

16. The edible food composition as defined by claim 10 wherein said food product is selected from the group consisting of sherbet, ice milk, ice cream, sour cream, acidic sauce, or salad dressing.

* * * * *